(12) United States Patent
Almerico

(10) Patent No.: US 12,716,539 B2
(45) Date of Patent: Aug. 25, 2026

(54) SUBSEA FLOWLINE BLOCKAGE REMEDIATION USING EXTERNAL HEATING DEVICE

(71) Applicant: Oceaneering International, Inc., Houston, TX (US)

(72) Inventor: Sam Almerico, The Woodlands, TX (US)

(73) Assignee: Oceaneering International, Inc., Houston, TX (US)

( * ) Notice: Subject to any disclaimer, the term of this patent is extended or adjusted under 35 U.S.C. 154(b) by 1050 days.

(21) Appl. No.: 17/556,791

(22) Filed: Dec. 20, 2021

(65) Prior Publication Data

US 2022/0112975 A1 Apr. 14, 2022

Related U.S. Application Data

(62) Division of application No. 16/412,075, filed on May 14, 2019, now Pat. No. 11,231,137.

(51) Int. Cl.
*F16L 53/38* (2018.01)

(52) U.S. Cl.
CPC .................................... *F16L 53/38* (2018.01)

(58) Field of Classification Search
CPC ........ G02F 1/172; Y10T 428/25; F16L 1/123; F16L 53/38
USPC ...................................................... 137/15.01
See application file for complete search history.

(56) References Cited

U.S. PATENT DOCUMENTS 6,439,808 B1 * 8/2002 Smidt ..................... F16L 1/123 405/172
6,509,557 B1 * 1/2003 Bass ...................... E21B 43/01 392/318
7,123,826 B2 * 10/2006 Belcher .................... H05B 3/48 392/465
7,282,638 B2 * 10/2007 Karlsen ..................... F16L 1/20 174/15.1
9,360,146 B2 * 6/2016 Rosvold .................. F16L 53/38
11,441,719 B2 * 9/2022 Pionetti .................. F16L 53/34
11,940,077 B2 * 3/2024 Iversen ................... E21B 43/01
2006/0243471 A1 * 11/2006 Karlsen .................. F16L 53/37 174/15.1
2008/0251668 A1 * 10/2008 Stokes ...................... F16L 1/24 248/230.4
2013/0014833 A1 * 1/2013 Geertsen ................ H05B 6/108 137/341

(Continued)

FOREIGN PATENT DOCUMENTS

WO WO-2017143389 A1 * 8/2017 ............. F16L 53/34

*Primary Examiner* — Steven W Crabb
*Assistant Examiner* — Ket D Dang
(74) *Attorney, Agent, or Firm* — Maze IP Law, P.C.

(57) ABSTRACT

External heating assembly 1 is usable to heat subsea flowline 100 and remediate a blockage in subsea flowline 100 and comprises a predetermined set of heaters 10; one or more conductive layers 20 configured to uniformly distribute heat over an exterior of subsea flowline 100; one or more insulating layers 30 adapted to shield subsea flowline 100, the predetermined set of heaters 10, and conductive layers 20 from ambient seawater temperature; an anchor; and a strength member. The predetermined set of heaters 10 may comprise one or more mineral insulated cables capable of reaching very high temperatures with very little power and minimal controls.

16 Claims, 4 Drawing Sheets

(56) References Cited

U.S. PATENT DOCUMENTS

2017/0159866 A1* 6/2017 Glejbøl .................. F16L 53/38
2019/0285219 A1* 9/2019 Pionetti .................. F16L 53/34

* cited by examiner

SUBSEA FLOWLINE BLOCKAGE REMEDIATION USING EXTERNAL HEATING DEVICE

RELATION TO OTHER APPLICATIONS

This application is a divisional application of U.S. application Ser. No. 16/412,075 and claims priority through U.S. Provisional Application 62/671,338 filed on May 14, 2018.

BACKGROUND

Existing remediation methods for externally heating a subsea flowline have, to this point, been largely unsuccessful. Most heating methods only cover a short distance or require a lot of power.

FIGURES

Various figures are included herein which illustrate aspects of embodiments of the disclosed inventions.

DESCRIPTION OF EXEMPLARY EMBODIMENTS

Figure 1:
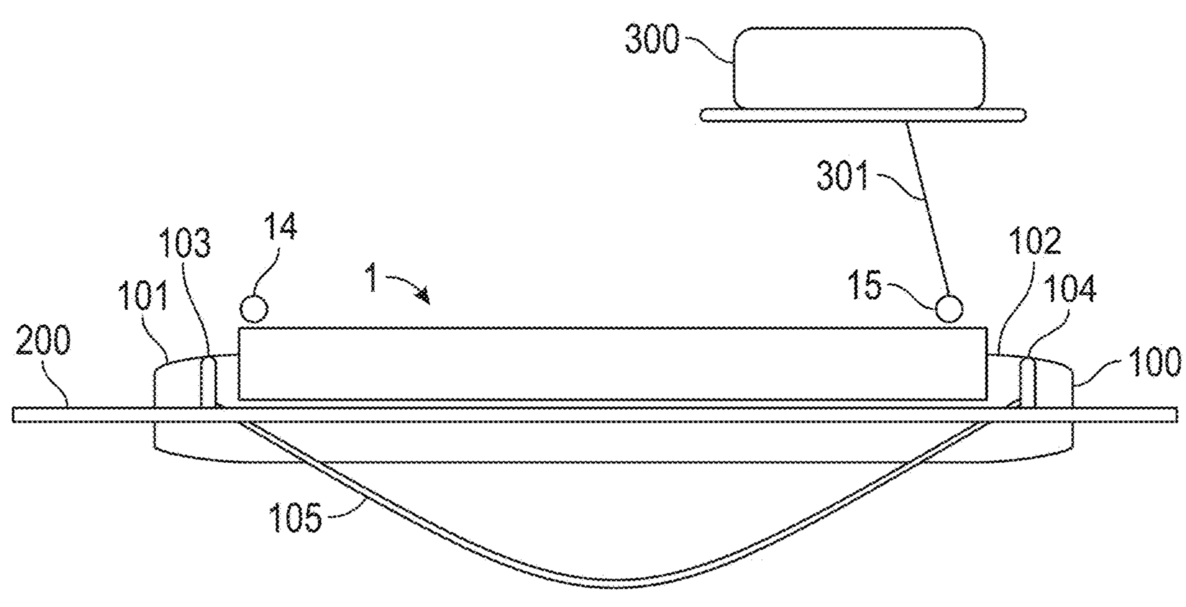
FIG. 1 is a block diagram of the claimed invention.
Figure 2:
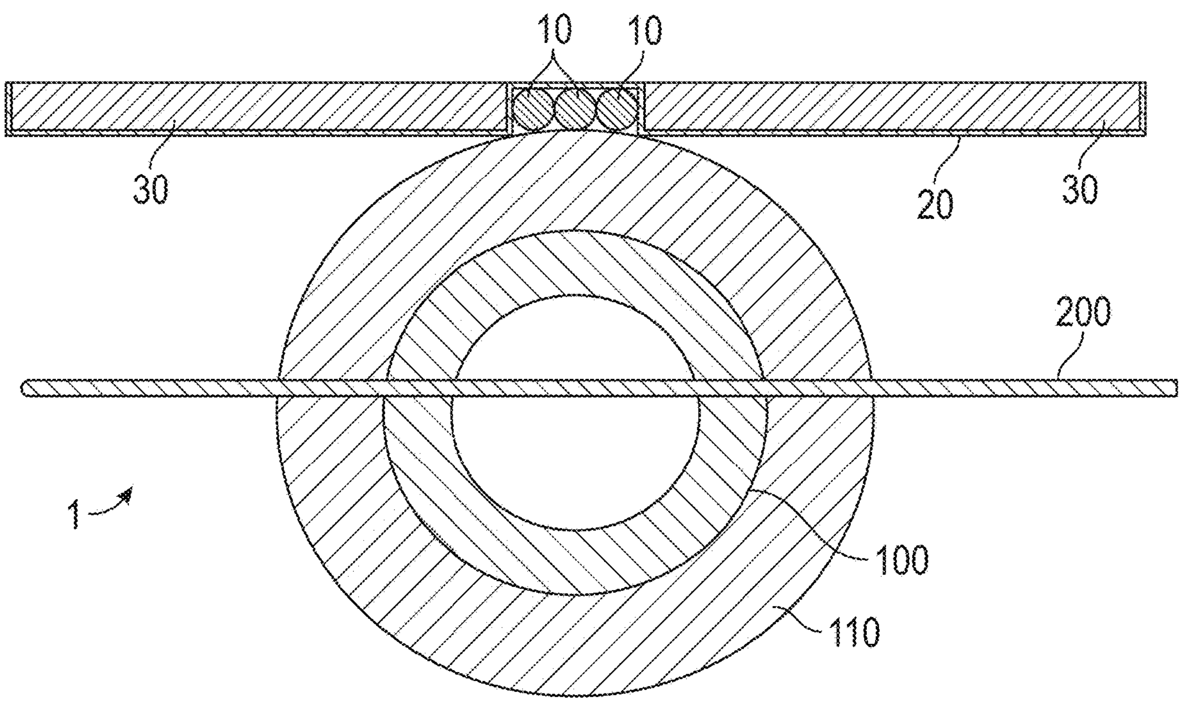
FIG. 2 is a cross-section view in partial perspective of an exemplary embodiment of the claimed invention.
Figure 3:
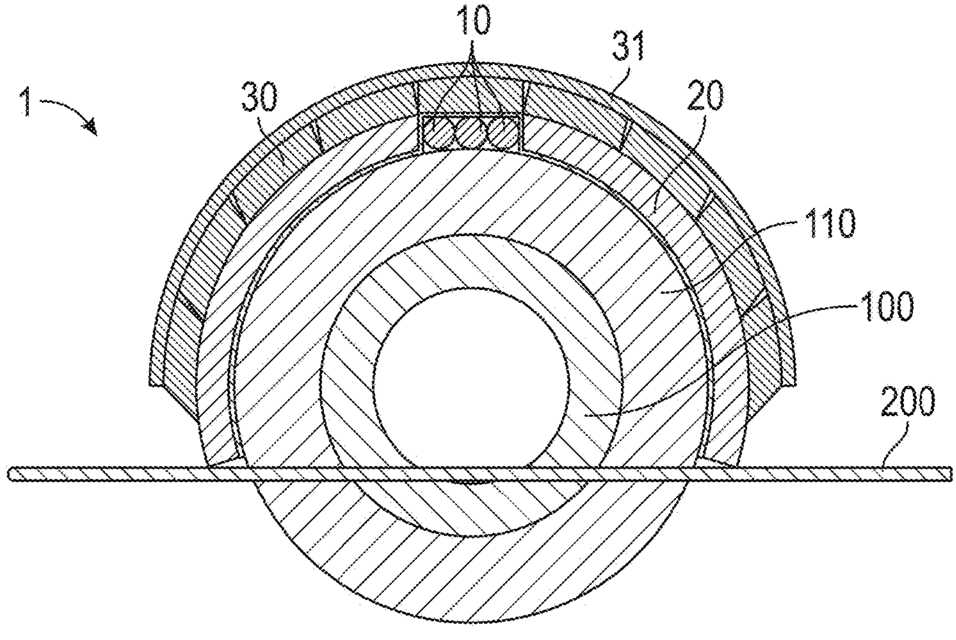
FIG. 3 is a cross-section view in partial perspective of a further exemplary embodiment of the claimed invention.

In a first embodiment, referring generally to FIG. 1, external heating assembly 1, which is usable to heat subsea flowline 100, which may comprise flowline insulation 110, disposed subsea to remediate blockages, comprises a first end 101; second end 102 disposed distally from first end 101; a predetermined set of heaters 10 (FIG. 2) disposed between first end 101 and second end 102 proximate subsea flowline 100; one or more conductive layers 20 (FIG. 2) disposed between first end 101 and second end 102 about an exposed surface of subsea flowline 100 and further about a predetermined portion of the predetermined set of heaters 10 so as to not preclude access to the exposed surface of subsea flowline 100 by the predetermined set of heaters 10 where conductive layers 20 are configured to uniformly distribute heat over an exterior of subsea flowline 100; one or more insulating layers 30 (FIG. 2) disposed between first end 101 and second end 102 about conductive layers 20 away from subsea flowline 100 where insulating layers 30 are adapted to shield subsea flowline 100, the predetermined set of heaters 10, and conductive layers 20 from ambient seawater temperature and where at least one insulating layer 30 comprises an insulating blanket, comprising an insulating material which can withstand hydrostatic forces; an anchor comprising first clamp 103 disposed at or proximate to first end 101 and second clamp 104 disposed at or proximate to second end 102, where first clamp 103 and second clamp 104 are adapted to provide a clamping force to secure external heating assembly 1 to subsea flowline 100; and strength member 105 terminated at first clamp 103 and second clamp 104, where strength member 105 is adapted to provide structural strength for lifting external heating assembly 1.

In embodiments, the predetermined set of heaters 10 may further comprise one or more heat trace cables 11 (not shown in the figures but basically as illustrated at callout 10), by way of example and not limitation three such cables. In such embodiments, external heating assembly 1 typically further comprises electrical terminations 14,15, one on each end of the predetermined set of heaters 10, where electrical terminations 14,15 are operatively in electrical communication with heat trace cable 11. Electrical terminations 14,15 may be housed in the anchor.

In embodiments, the predetermined set of heaters 10 may also comprise one or more mineral insulated cables 13 (not shown in the figures but basically as illustrated at callout 10) further comprising a corrosion resistant exterior, by way of example and not limitation three such cables. In these embodiments, external heating assembly 1 typically comprises electrical terminations 14,15, one on each end of the predetermined set of heaters 10, where electrical terminations 14,15 are operatively in electrical communication with mineral insulated cable 13. Mineral insulated cable 13 is typically capable of reaching very high temperatures with very little power and minimal controls.

Where present, electrical termination 14 on first end 103 may be shorted, with or without electrical resistors, and electrical termination 15 on second end 104 may be terminated to a subsea wet-mate electrical connector (not shown in the figures).

In other embodiments, the predetermined set of heaters 10 comprise heated fluid disposed within conduit 12.

In certain embodiments, referring additionally to FIGS. 2-5, the predetermined set of heaters 10 comprise a plurality, e.g. three, separate heating cables 10. In these embodiments, the plurality of separate heating cables are typically evenly distributed over a top half of subsea flowline 100 and may further be in contact with each other on the exterior of subsea flowline 100.

Conductive layer 20 is used to evenly disperse heat generated by the predetermined set of heaters 10 over a portion, e.g. the top, of subsea flowline 100. This enables the predetermined set of heaters 10. Without it, the heat from the predetermined set of heaters 10 may not be sufficient to remediate blockages.

Figure 4:
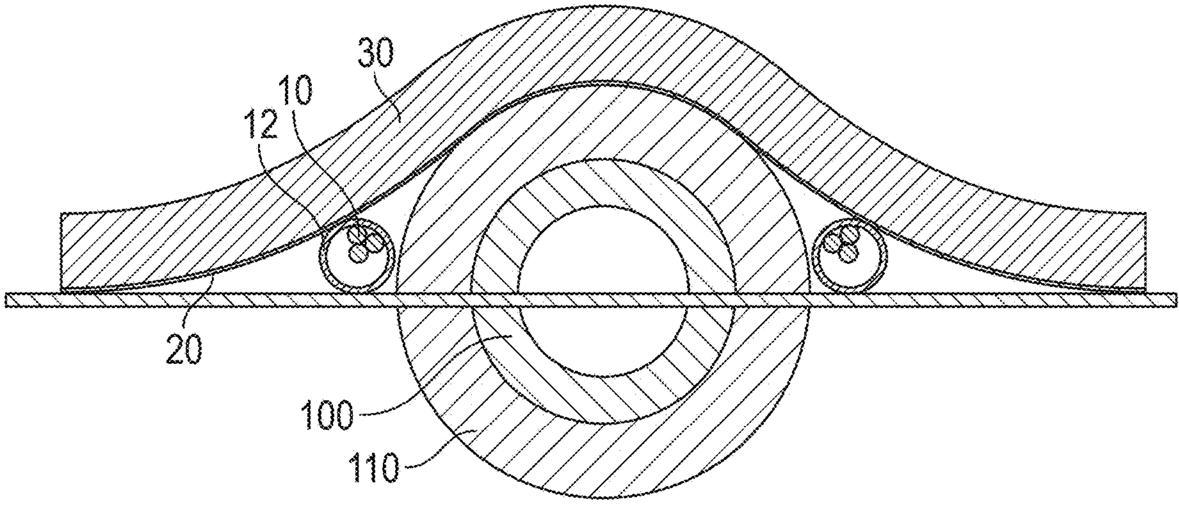
FIG. 4 is a cross-section view in partial perspective of a further exemplary embodiment of the claimed invention.

Referring additionally to FIG. 4, external heating assembly 1 may comprise one or more conduits 12 within which the predetermined set of heaters 10 may be disposed. These conduits 12 may comprise a coiled tubing assembly which is laid on seabed 200 adjacent to subsea flowline 100. In embodiments, the coiled tubing assembly may be disposed on a seabed adjacent to conductive layer 20 and may be laid on seabed 200 at a substantial length by itself.

If conduits 12 are present, the predetermined set of heaters 10 may comprise or be surrounded by heated fluid disposed within conduit 12. Further, one or more blankets, e.g., 31 (FIG. 3), comprising insulating layer 30 and conductive layer 20 may be laid on top of subsea flowline 100 after installation of the coiled tubing assembly.

Figure 5:
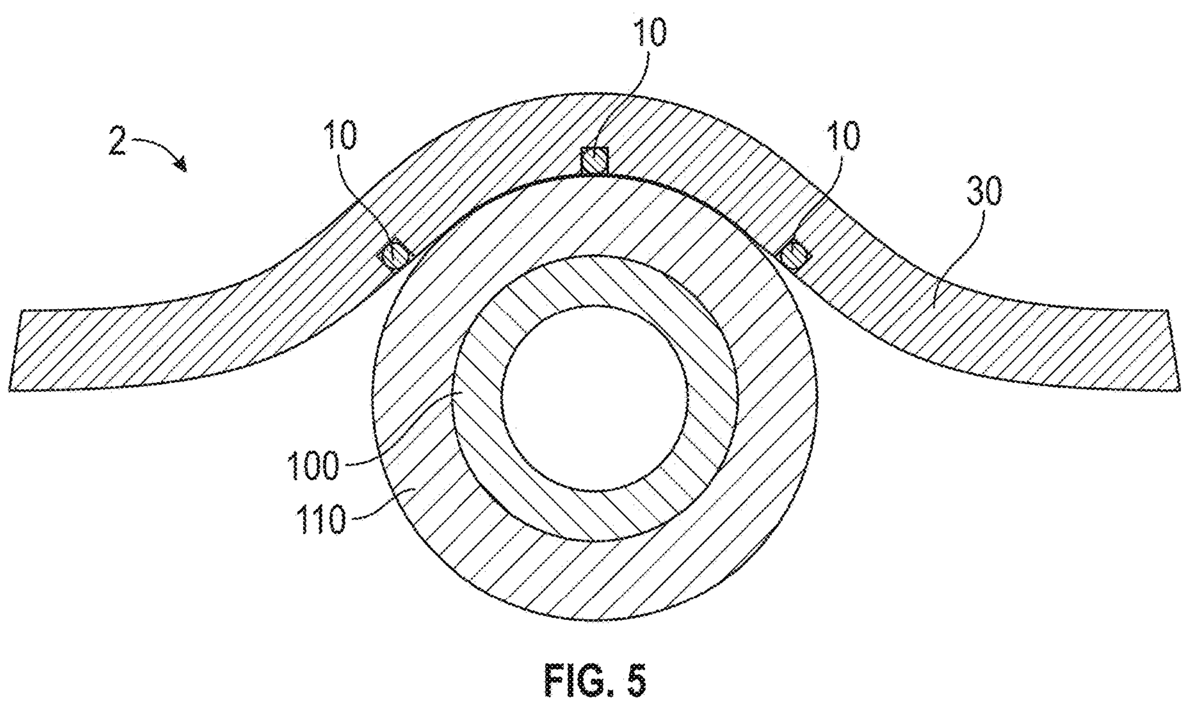
FIG. 5 is a cross-section view in partial perspective of a further exemplary embodiment of the claimed invention and FIG. 5A is a closeup view of that embodiment.
Figure 5A:
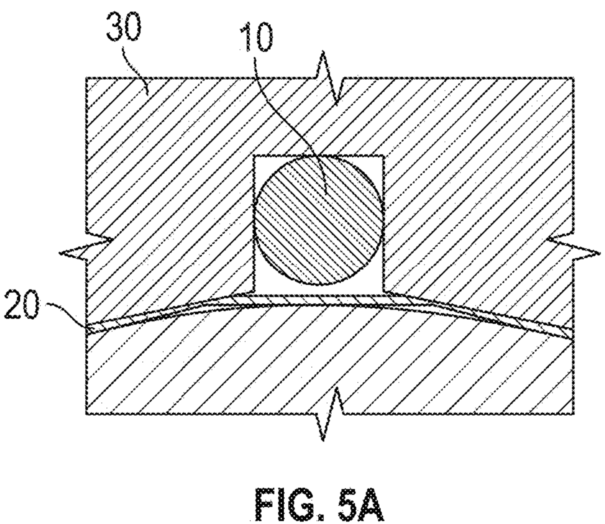
Figure 6:
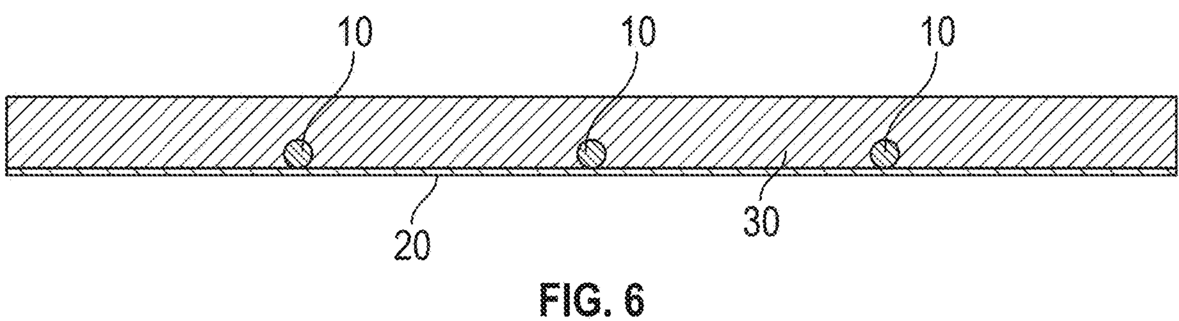
FIG. 6 is a view in partial perspective of a further exemplary embodiment of the claimed invention.

Referring additionally to FIG. 5, in embodiments the predetermined set of heaters 10 may be imbedded in insulating layer 30 and may further be covered with and bonded to conductive layer 20 (FIG. 5A).

Figure 7:
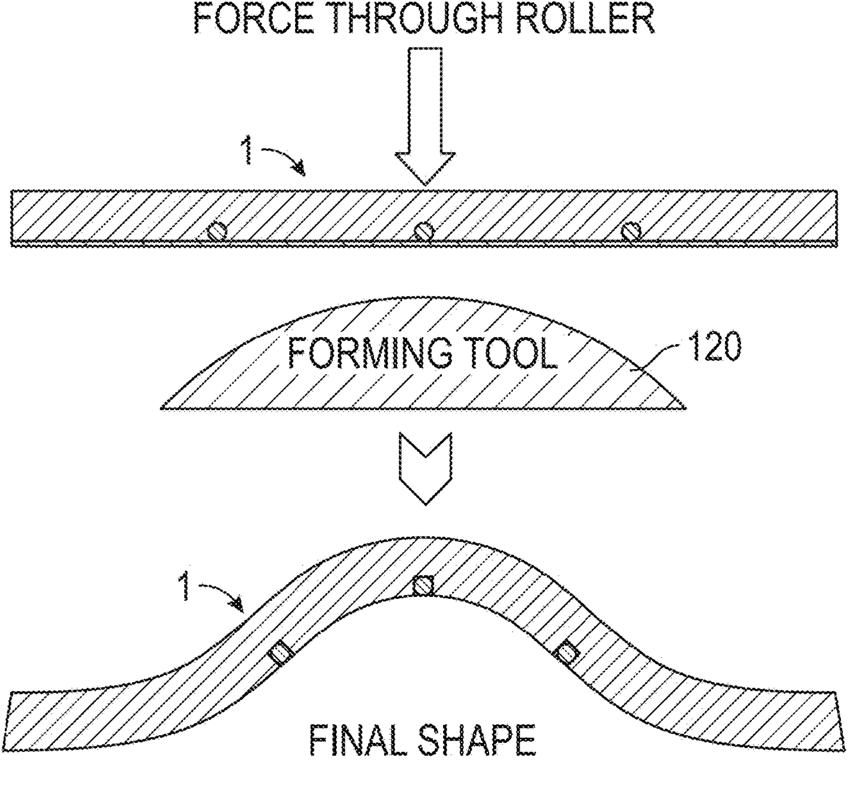
FIG. 7 is a block diagram showing formation of an exemplary embodiment of the claimed invention.

In contemplated embodiments, referring to FIG. 7, external heating assembly 1 may be formed to conform to a shape of the exterior surface of subsea flowline subsea 100, such as with forming device 120. This forming may occur during deployment, prior to entering the sea, with a forming device on the deck of a vessel (not shown in the figures). Alternatively, external heating assembly 1 may be formed to a shape of the exterior surface of subsea flowline 100 during deployment, near the subsea flowline, after entering the sea, with forming device 120 on subsea flowline 100.

In any of these embodiments, external heating assembly 1 may further comprise a conductive fluid, such as a gel, grease, or the like, or a combination thereof, disposed between, and adapted to maintain contact with, conductive layer 20 and subsea flowline 100.

In the operation of exemplary methods, referring back to FIGS. 1 and 2, external heating assembly 1 may be constructed by laying a predetermined set of mineral insulated cables 10, typically laid flat side by side, on a top surface of subsea flowline 100; forming one or more conductive layers 20 around mineral insulated cables 10, initially with one or more primary insulation layers 30; forming external heating assembly 1 into a shape of subsea flowline 100, either topside or subsea; and placing the formed external heating assembly 1 onto subsea flowline 100.

In certain embodiments, a secondary insulation blanket 31 (FIG. 3) may be placed over the formed external heating assembly 1 for additional insulation.

In embodiments, the predetermined set of mineral insulated cables comprises a plurality of mineral insulated cables 10, e.g. three, which are embedded or contained within an inner surface of insulation layer 30 closest to subsea flowline 100 and spaced so that they will be equally dispersed over the top surface of subsea flowline 100 after installation.

Where a plurality of mineral insulated cables 10 is present, these mineral insulated cables 10 may further be placed inside coiled tubing 12 comprising a substantial length, i.e. a length which deploys over more than a minimum longitudinal area of subsea flowline 100, to form a coiled tubing assembly and conductive layer 20 and insulation layer 30 bonded together to form a flat blanket of varying length, in either short pieces or in a long continuous length roll. The coiled tubing assembly may be laid on seabed 200 near subsea flowline first 100, e.g. first, and external heating assembly 1 formed into the shape of subsea flowline, either topside or subsea, and then placed onto subsea flowline 100.

In further embodiments, a blockage in subsea flowline 100 may be remediated by disposing external heating assembly 1, which is as described above, proximate subsea flowline 100. Electrical power may be provided to the predetermined set of heating cables 10 such as using remotely operated vehicle 300 or other source of electrical power such as a topside vessel (not shown in the figures) or subsea power supply (not shown in the figures), via electrical umbilical 301. The electrical power then energizes the predetermined set of heaters 10 which provide heat to subsea flowline 100.

The anchor, described above, is typically disposed at each end 101,102 to provide a clamping force to subsea flowline 100. In addition, the anchor may be used to provide an anchoring force to seabed 200.

In other embodiments, a weight device (not shown in the figures), e.g. concrete mattress or self-weight ballast or the like or a combination thereof, may be used to provide a holding force downward on external heating assembly 1 to keep external heating assembly 1 in contact with subsea flowline 100.

In embodiments, as illustrated in FIG. 7, external heating assembly 1 may be formed to a shape of an exterior surface of subsea flowline 100 subsea with forming device 120 prior to or during deployment, prior to entering the sea, with forming device 120 on the deck of a vessel or formed during deployment, near the subsea flowline, after entering the sea, with forming device 120 on subsea flowline 100.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A method, comprising:

a) disposing an external heating assembly, usable to heat a subsea flowline to remediate a blockage in the subsea flowline, proximate the subsea flowline, the external heating assembly comprising:
   i) a first end;
   ii) a second end disposed distally from the first end;
   iii) a predetermined set of heaters adapted to be disposed proximate and externally to, and longitudinally along, an exposed exterior surface of the subsea flowline between the first end and the second end, the predetermined set of heaters comprising a predetermined set of heating cables;
   iv) a heat conductive layer disposed between the first end and the second end and adapted to be disposed about the exposed portion of the exterior surface of the subsea flowline and about a predetermined portion of the predetermined set of heaters so as to not preclude access to the exposed portion of the exterior surface of the subsea flowline by the predetermined set of heaters, the heat conductive layer configured to uniformly distribute heat over the exterior of the subsea flowline;
   v) an insulating layer disposed about the heat conductive layer between the first end and the second end and configured to be disposed away from the heat conductive layer and away from the subsea flowline, the insulating layer adapted to shield the subsea flowline, the predetermined set of heaters, and the heat conductive layer from ambient seawater temperature, the insulating layer comprising an insulating blanket comprising an insulating material which can withstand a predetermined set of hydrostatic forces;
   vi) an anchor comprising a first clamp disposed at the first end and a second clamp disposed at the second end, the first clamp and the second clamp adapted to provide a clamping force sufficient to secure the external heating assembly to the subsea flowline; and
   vii) a strength member terminated at the first clamp and the second clamp, the strength member adapted to provide structural strength for lifting the external heating assembly; and b) providing electrical power to the predetermined set of heating cables sufficient to energize the predetermined set of heaters and cause the predetermined set of heaters to provide heat sufficient to remediate the blockage in the subsea flowline.

2. The method of claim 1, wherein the predetermined set of heaters further comprises a heat trace cable and the external heating assembly further comprises a first electrical termination and a second electrical termination, the first electrical termination disposed on the first end of the predetermined set of heaters and the second electrical termination disposed on the second end of the predetermined set of heaters, the first and second electrical terminations operatively in electrical communication with the heat trace cable, the method further comprising:

a) shorting the first electrical termination disposed at the first end; and b) terminating the second electrical termination disposed at the second end to a subsea wet-mate electrical connector.

3. The method of claim 2, wherein the first electrical termination is shorted with an electrical resistor.

4. The method of claim 2, wherein the first electrical termination is shorted without an electrical resistor.

5. The method of claim 1, wherein the external heating assembly further comprises a conduit and the predetermined set of heaters is disposed within the conduit, the method further comprising:

a) disposing a fluid within the conduit; and b) heating the fluid.

6. The method of claim 1, wherein the external heating assembly further comprises a set of conduits within which the predetermined set of heaters is to be disposed, the conduits comprising a coiled tubing assembly, the method further comprising laying the coiled tubing assembly on a seabed adjacent to a subsea flowline.

7. The method of claim 6, further comprising disposing the coiled tubing assembly on the seabed adjacent to the conductive layer.

8. The method of claim 1, further comprising using a remotely operated vehicle to provide the electrical power to the predetermined set of heating cables sufficient to energize the predetermined set of heaters to cause the predetermined set of heaters to provide heat sufficient to remediate the blockage in the subsea flowline.

9. The method of claim 1, further comprising using a weight device to provide a holding force downward on the external heating assembly to keep the external heating assembly in contact with the subsea flowline.

10. The method of claim 1, further comprising forming the external heating assembly into a shape of the exterior surface of the subsea flowline.

11. The method of claim 10, further comprising forming the shape subsea with a forming device prior to or during deployment.

12. The method of claim 10, further comprising forming the shape prior to the external heating assembly entering the sea using a forming device on a deck of a vessel.

13. The method of claim 10, further comprising forming the shape during deployment of the external heating device, proximate the subsea flowline, after the external heating assembly enters the sea using a forming device disposed proximate the subsea flowline.

14. A method, comprising:

a) creating an external heating assembly by:

i) laying a predetermined set of mineral insulated heating cables in a predetermined orientation on a top surface of a subsea flowline, the predetermined set of mineral insulated heating cables configured to heat the subsea flowline;

ii) forming a heat conductive layer around the predetermined set of mineral insulated heating cables; and iii) forming a primary insulation layer about an exterior portion of the heat conductive layer;

b) forming the external heating assembly into a shape of the subsea flowline, either topside or subsea; and c) placing the formed external heating assembly onto the subsea flowline.

15. The method of claim 14, further comprising placing a secondary insulation blanket over the formed external heating assembly for additional insulation.

16. The method of claim 14, wherein the predetermined set of mineral insulated cables comprises a plurality of mineral insulated cables, the method further comprising:

a) embedding the predetermined set of mineral insulated cables within an inner surface of the insulation layer closest to the subsea flowline; and b) spacing the embedded predetermined set of mineral insulated cables to be equally dispersed over the top surface of the subsea flowline after installation.

* * * * *